(12) United States Patent
Abele et al.

(10) Patent No.: US 8,544,881 B2
(45) Date of Patent: Oct. 1, 2013

(54) VEHICLE OCCUPANT RESTRAINT SYSTEM AND METHOD OF RESTRAINING A VEHICLE OCCUPANT

(75) Inventors: Timo Abele, Abtsgmuend (DE); Daniele Aranzulla, Essingen (DE)

(73) Assignee: TRW Automotive GmbH, Alfdorf (DE)

( * ) Notice: Subject to any disclaimer, the term of this patent is extended or adjusted under 35 U.S.C. 154(b) by 0 days.

(21) Appl. No.: 13/279,469

(22) Filed: Oct. 24, 2011

(65) Prior Publication Data

US 2012/0267881 A1 Oct. 25, 2012

(30) Foreign Application Priority Data

Nov. 17, 2010 (DE) .......................... 10 2010 051 421

(51) Int. Cl.
*B60R 21/205* (2011.01)
(52) U.S. Cl.
USPC ........................................ 280/732; 280/728.1
(58) Field of Classification Search
USPC ............................................... 280/732, 728.1
See application file for complete search history.

(56) References Cited

U.S. PATENT DOCUMENTS

| | | | | | |
|---|---|---|---|---|---|
| 4,169,613 | A | * | 10/1979 | Barnett | 280/732 |
| 4,911,471 | A | * | 3/1990 | Hirabayashi | 280/732 |
| 5,018,761 | A | * | 5/1991 | Henseler | 280/730.1 |
| 5,306,042 | A | * | 4/1994 | Frank | 280/728.3 |
| 5,308,111 | A | * | 5/1994 | Sommer | 280/728.3 |
| 5,385,366 | A | * | 1/1995 | Frank et al. | 280/728.3 |
| 5,398,959 | A | * | 3/1995 | Avila | 280/728.3 |
| 5,474,324 | A | * | 12/1995 | Bentley et al. | 280/728.3 |
| 5,609,363 | A | * | 3/1997 | Finelli | 280/743.2 |
| 5,613,701 | A | * | 3/1997 | Bentley et al. | 280/728.3 |
| 5,941,558 | A | * | 8/1999 | Labrie et al. | 280/728.3 |
| 6,045,154 | A | * | 4/2000 | Walton et al. | 280/728.3 |
| 6,053,527 | A | * | 4/2000 | Gans et al. | 280/728.3 |
| 6,082,760 | A | * | 7/2000 | Ukai et al. | 280/728.3 |
| 6,131,945 | A | * | 10/2000 | Labrie et al. | 280/728.3 |
| 6,203,056 | B1 | * | 3/2001 | Labrie et al. | 280/728.3 |
| 6,702,322 | B2 | * | 3/2004 | Eyrainer et al. | 280/730.1 |
| 7,325,827 | B2 | * | 2/2008 | Reiter et al. | 280/732 |
| 7,722,077 | B2 | * | 5/2010 | Dietze et al. | 280/732 |
| 2005/0067819 | A1 | * | 3/2005 | Segura | 280/732 |
| 2010/0052297 | A1 | * | 3/2010 | Fukawatase et al. | 280/732 |
| 2011/0109068 | A1 | * | 5/2011 | Fukagawa | 280/732 |

\* cited by examiner

*Primary Examiner* — Paul N Dickson
*Assistant Examiner* — Nicole Verley
(74) *Attorney, Agent, or Firm* — Tarolli, Sundheim, Covell & Tummino LLP

(57) ABSTRACT

A vehicle occupant restraint system comprises an airbag module (16) disposed in an instrument panel (14) the airbag (18) of which extends when inflated from a receipt in the instrument panel (14) into the interior of the vehicle (10). A supporting structure (20) for the airbag (18) on a side of the airbag (18) facing a windscreen (12) is configured so that it supports the airbag (18) against the forces occurring when a vehicle occupant immerses in the airbag (18).

16 Claims, 2 Drawing Sheets

VEHICLE OCCUPANT RESTRAINT SYSTEM AND METHOD OF RESTRAINING A VEHICLE OCCUPANT

FIELD OF THE INVENTION

The invention relates to a vehicle occupant restraint system comprising an airbag module arranged in an instrument panel.

BACKGROUND OF THE INVENTION

Airbag modules of this type are mainly used for restraining passengers in an automotive vehicle in the case of accident.

In conventional systems the airbag deploys into the interior of the vehicle and is supported by the windscreen of the vehicle with its side facing away from the vehicle occupant. Due to this supporting effect the shifting forces occurring when the vehicle occupant immerses into the airbag are partly transferred to the vehicle through the windscreen. The windscreen also ensures stabilization of the airbag and contributes to holding the same at its provided position.

Later developments in vehicle design, however, turn to strongly curved windscreen and rounded vehicle fronts. In these cases the windscreen is too distant from the vehicle occupants, however, to be reasonably used for supporting the airbag.

It is therefore the object of the invention to modify a vehicle occupant restraint system for such vehicle in a simple way so that a secure restraint of the vehicle occupant is given.

SUMMARY OF THE INVENTION

According to the invention, this is achieved in a vehicle occupant restraint system comprising an airbag module arranged in an instrument panel the airbag of which extends, when inflated, from a receipt in the instrument panel into the interior of the vehicle. A supporting structure for the airbag on the side of the airbag facing the windscreen is arranged to support the airbag against the forces occurring when a vehicle occupant immerses into the airbag. The supporting structure constitutes quasi an abutment to the airbag and substantially completely replaces the supporting function of the windscreen. At the same time, the supporting structure also has a stabilizing effect on the airbag and may contribute to positioning and maintaining the airbag at the desired location, preferably centrally with respect to the vehicle occupant.

The supporting structure is preferably arranged below the instrument panel before the airbag is activated and moves out into the interior of the vehicle along with the airbag. It can be accommodated completely together with the airbag in the airbag module and can, e.g., be folded together with the same so that no or only minor changes have to be made at the instrument panel itself.

Preferably the airbag does not contact the windscreen even when deployed. This applies at least to the deployed state without the influence of a vehicle occupant, but advantageously also to the moment when the vehicle occupant or the dummy used for development and design immerses in the airbag. The supporting structure is advantageously configured to solely take over the stabilization of the airbag and absorb the forces.

The vehicle occupant restraint system according to the invention can be used especially well in vehicles in which the area of the instrument panel where the airbag module is arranged is oriented substantially horizontally and an outlet opening of the airbag module is directed substantially upwards. Exactly in such cases conventionally a support of the airbag at the windscreen is used to impart the required stability to the airbag, to position it during deployment and to maintain it at its deployed position.

In accordance with an advantageous embodiment, the supporting structure has at least one fastening element which is mounted at the instrument panel or at the airbag module. Through this fastening element the forces can be easily transferred to a structure of the vehicle which, in the case of accident, is adapted to absorb the forces acting on the airbag.

The supporting structure preferably has at least one flexible member adjacent to the airbag at the windscreen side. The flexible member can be mounted to the airbag and/or surround the airbag toward the windscreen. It is especially a textile fabric member, e.g. a fabric, designed like the airbag wall.

The entire supporting structure including the fastening elements can have a flexible design and can be accommodated in the airbag module folded together with the airbag. This allows simple and inexpensive manufacture, for instance of the same fabric which is used for the airbag. Furthermore, the space required is hardly increased vis-à-vis a conventional airbag.

The forces acting on the fastening elements and the entire supporting structure are determined especially by the size of the vehicle occupant, the case of load (severity of accident or crash scenario), the folding and size of the airbag and the type of inflator. The supporting structure withstands these forces and for these forces the supporting structure serves as abutment to the airbag. In particular a conventional flap to cover the airbag module in the instrument panel to which the airbag may be adjacent in the deployed state cannot be considered to be a supporting structure in the meaning used in this case.

An appropriate supporting structure includes a supporting sail, for instance, a large area of which is adjacent to the airbag and which absorbs the shifting forces occurring. The supporting sail substantially extends over the entire width of the airbag and can be, for instance, rhombus-shaped, wherein the tips of the rhombus are arranged in longitudinal direction of the airbag. The supporting sail is preferably made of a fabric, for example of the same fabric as used for manufacturing the airbag. It can be folded and accommodated in the airbag module together with the airbag and then deploys together with the airbag upon deployment of the latter to its final position in which it has its supporting effect.

The supporting structure preferably comprises at least one restraint, for instance in connection with an afore-described supporting sail. The restraint can extend, for example, transversely over the airbag and with its ends can be mounted to the vehicle. In this case the restraint also serves as fastening element.

For the supporting structure preferably two fastening points are provided that are arranged spaced apart laterally from the airbag. The fastening points can be provided, for instance, in the instrument panel approximately 5 to 20 cm distant from the lateral edges of the outlet opening of the airbag. In this way, a good transfer of forces to the vehicle and stable bracing of the airbag in the desired restraining position is possible.

The supporting structure is preferably arranged so that already during deployment of the airbag it influences the direction of deployment thereof. In this case the supporting structure, especially a supporting sail, and the instrument panel can form sort of a deployment passage in which the airbag is guided into its desired restraining position.

It has turned out to be advantageous that in the inflated state of the airbag the supporting structure is disposed below the uppermost point of the airbag. The supporting structure can be adjacent to the airbag in the lower third thereof, for example.

The invention also relates to a method of restraining a vehicle occupant by an afore-described restraint system, wherein the supporting structure together with the instrument panel solely absorbs the shifting forces exerted by a vehicle occupant or a dummy used in standard crash tests upon immersion into the airbag in the case of a head-on collision. Consequently, no further component is required to stabilize or support the airbag. Even if the airbag is adjacent to the windscreen or to the folded flap of the airbag module, these components have no supporting effect, nor does any substantial transfer of forces to these components occur.

As a matter of course, the invention can also be used in conventional vehicles.

DESCRIPTION OF THE EXAMPLE EMBODIMENT

Figure 1:
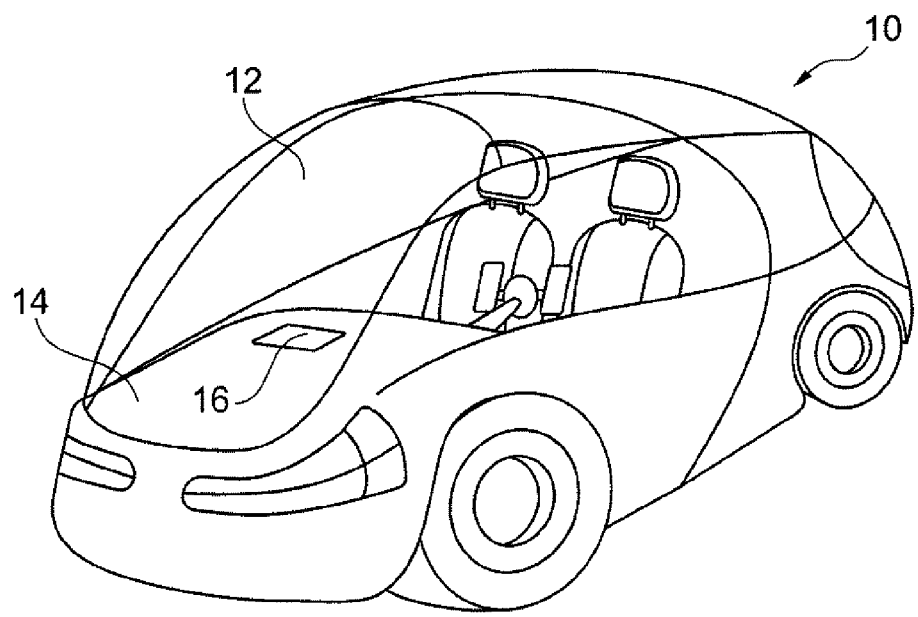
FIG. 1 shows a schematic perspective view of a vehicle comprising a vehicle occupant restraint system according to the invention in a non-activated state.

FIG. 1 illustrates a vehicle 10 having a strongly curved windscreen 12 that is arranged extremely forward to the vehicle front. An instrument panel 14 is disposed substantially horizontally in the front area of the vehicle. At the passenger side an airbag module 16, only the cover flap of which formed in the instrument panel 14 is shown, is arranged below the instrument panel 14. The airbag module 16 is provided in the front part of the instrument panel 14 directed to the passenger.

Figure 2:
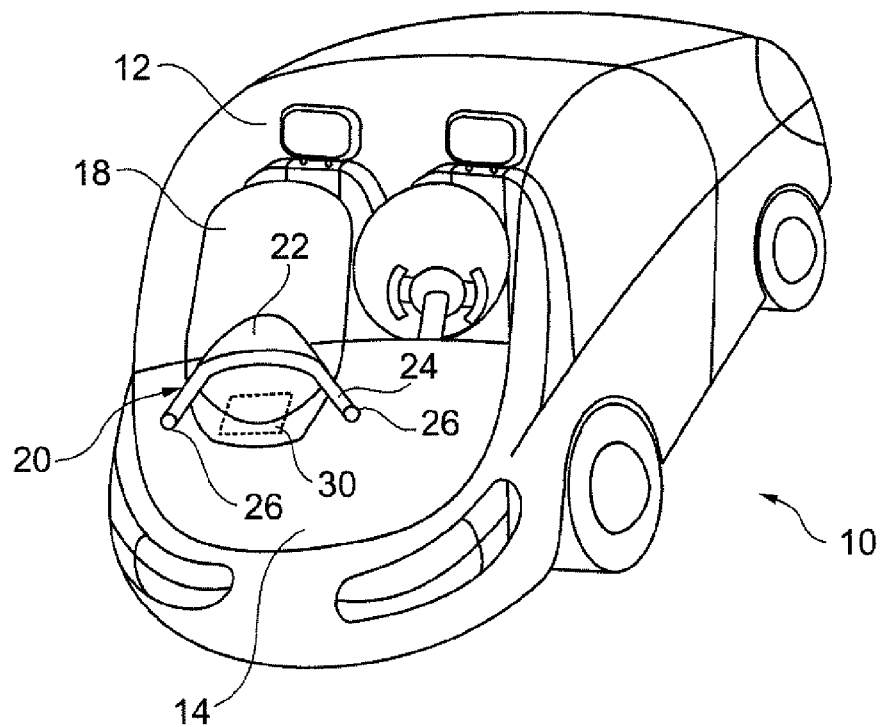
FIG. 2 shows the vehicle of FIG. 1 comprising a restraint system according to the invention in the activated state.

In FIG. 2 the vehicle occupant restraint system, which includes the airbag module 16, is shown in the activated state. An airbag 18, which has been arranged in a folded state below the instrument panel 14 in a module casing not shown, in the deployed and inflated state extends in the direction of the occupant to restrain him. The airbag 18 is supported on the side facing the windscreen 12 by a supporting structure 20 that has the function to absorb the forces occurring when the vehicle occupant immerses in the airbag 18 and to back up the airbag 18 against these forces.

Figure 3:
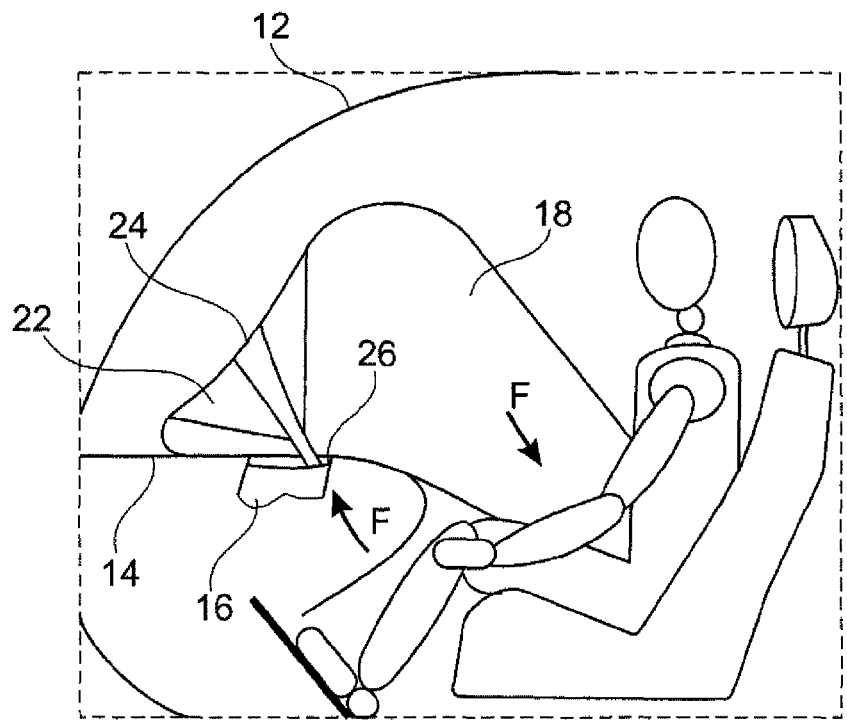
FIG. 3 shows the vehicle occupant restraint system according to the invention in the activated state in a side view.
Figure 4:
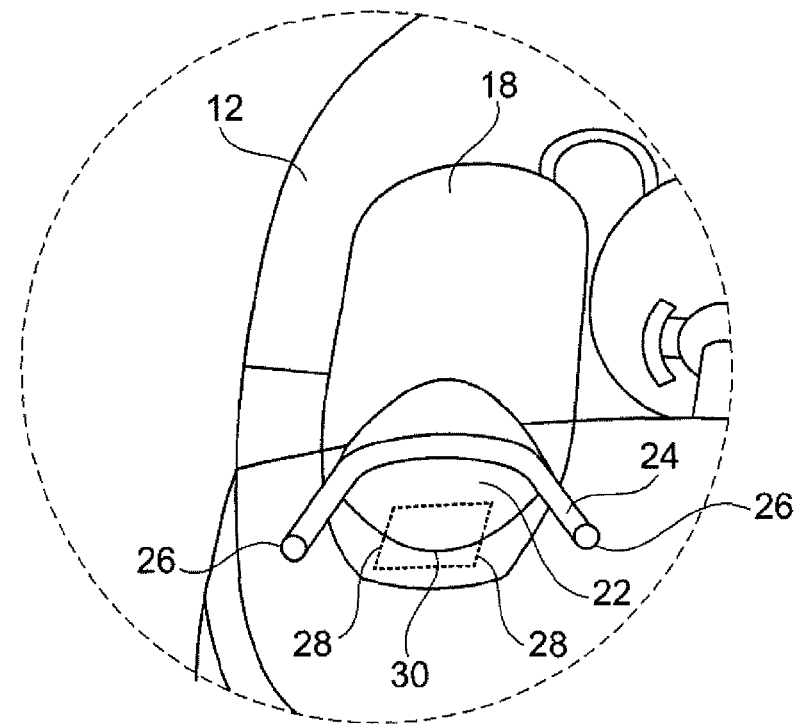
FIG. 4 shows the vehicle occupant restraint system according to the invention in the activated state in a front view.

The supporting structure 20 includes at least one flexible member and in the embodiment shown here consists of a large-area rhombus-shaped supporting sail 22 and a restraint 24 extending transversely over the supporting sail 22 and the airbag 18 (better visible in FIGS. 3 and 4). The supporting sail 22 and the restraint can also be formed in one piece. The entire supporting structure 20, viz. both the supporting sail 22 and the restraint 24, are parts separate from the airbag 18 and are not part of the wall thereof.

The supporting sail 22 is adjacent to a large area of the wall of the airbag 18 on the side thereof facing the windscreen 12 and is sewn up completely or in portion to said wall. The tips of the rhombus are arranged in the longitudinal direction or the transverse direction of the airbag. The restraint 24 extends in the transverse direction of the airbag 18 over the corners of the supporting sail 22.

The supporting sail 22 and the restraint 24 can be mounted either individually or both to the wall of the airbag 18, but they may only be adjacent to the latter as well.

Before the airbag module is activated, the supporting structure 20 is folded together with the airbag 18 and arranged with the latter in the casing of the airbag module 16.

In the example shown here the restraint 24 extends to two fastening points 26 which are provided outside the airbag module 16 in the instrument panel 14. At these fastening points the forces exerted on the airbag 18 are transferred to the vehicle structure. The ends of the restraint 24 constitute fastening elements via which the supporting structure is connected to the vehicle. In this case, the fastening points 26 are distant at approx. 5 to 20 cm laterally from the side edges 28 at the outlet opening 30 of the airbag module 16 (cf. FIG. 4). The fastening points can also be formed at the side walls of the module casing or at extensions mounted thereto. Thus the airbag module and the entire supporting structure can be formed as a pre-fabricated assembly group.

The restraint 24 can be arranged, for instance, in a passage closed by a predetermined breaking point in the instrument panel 14 prior to activating the vehicle occupant restraint system (not shown in detail).

The supporting structure, in particular the supporting sail 22, is arranged in the lower third of the inflated airbag 18 and definitely below its uppermost point (cf. FIG. 3). Upon deployment of the airbag 18 the instrument panel 14 and the supporting sail 22 constitute sort of a deployment passage influencing the direction of deployment of the airbag 18 and moving it obliquely upwards in the direction of the vehicle occupant. Moreover, the supporting structure 20 ensures that the airbag 18 is positioned centrally with respect to the vehicle occupant so that the latter has a good immersing position.

As is evident from FIG. 3, the airbag 18 does not contact the windscreen 12. The supporting structure 20 does not contact the windscreen, either. This is preferably the case also at the moment of immersion, wherein in this case it cannot always be excluded that the windscreen 12 is contacted. The forces occurring upon immersion of the vehicle occupant are exclusively absorbed, however, by the supporting structure 20 for a definitely major part and are transferred to the vehicle via the fastening points 26. Concretely speaking, the vehicle occupant restraint system is configured so that the supporting structure 20 together with the instrument panel 14 or another appropriate structure fixed to the vehicle solely absorbs the shifting forces exerted by a dummy used in standard crash tests that immerses in the airbag 18 during a head-on collision.

The invention claimed is:

1. A vehicle occupant restraint system comprising:
an airbag module (16) disposed in an instrument panel (14) the airbag (18) of which when inflated extends from a receipt in the instrument panel (14) into the interior of the vehicle (10),
wherein a supporting structure (20) extends around the airbag (18) and is provided on the side of the airbag (18) facing a windscreen (12), the supporting structure being fixed to the airbag (18) and being configured to support the airbag (18) against the forces occurring when a vehicle occupant immerses in the airbag (18).

2. The vehicle occupant restraint system according to claim 1, wherein prior to activation of the airbag (18) the supporting structure (20) is arranged below the instrument panel (14) and together with the airbag (18) moves out into the interior of the vehicle.

3. The vehicle occupant restraint system according to claim 1, wherein the airbag (18) when deployed is not in contact with the windscreen (12).

4. The vehicle occupant restraint system according to claim 1, wherein the area of the instrument panel (14) where the airbag module (16) is arranged is aligned substantially horizontally and an outlet opening (30) of the airbag module (16) is directed substantially upwards.

5. The vehicle occupant restraint system according claim 1, wherein the supporting structure (20) has at least one fastening element mounted to the instrument panel (14).

6. The vehicle occupant restraint system according to claim 1, wherein the supporting structure (20) has at least one fastening element mounted to the airbag module (16).

7. The vehicle occupant restraint system according to claim 1, wherein the supporting structure (20) has at least one flexible member which is adjacent to the airbag (18) at the windscreen side.

8. The vehicle occupant restraint system according to claim 7, wherein the supporting structure (20) has a supporting sail (22) a large area of which is adjacent to the airbag (18) and which absorbs the shifting forces occurring.

9. The vehicle occupant restraint system according to claim 1, wherein the supporting structure (20) includes at least one restraint (24).

10. The vehicle occupant restraint system according to claim 1, wherein for the supporting structure (20) two fastening points (26) are provided that are spaced apart laterally from the airbag (18).

11. The vehicle occupant restraint system according to claim 1, wherein the supporting structure (20) is arranged to influence during deployment of the airbag (18) the direction of deployment thereof.

12. The vehicle occupant restraint system according to claim 1, wherein the supporting structure (20) is arranged below the uppermost point of the airbag (18) when inflated.

13. A method of restraining a vehicle occupant making use of a restraint system according to claim 1, wherein the supporting structure (20) together with the instrument panel (14) solely absorbs the shifting forces exerted by a usual dummy immersing in the airbag (18) during a head-on collision.

14. The vehicle occupant restraint system according to claim 1, wherein the receipt in the instrument panel (11) is closed by a cover prior to inflation of the airbag (18), the supporting structure (20) being free of connection to the cover when the airbag (18) is deployed.

15. The vehicle occupant restraint system according to claim 1, wherein a portion of the supporting structure (20) facing the windscreen conforms to the shape of the airbag (18) during inflation of the airbag (18).

16. The vehicle occupant restraint system according to claim 1, wherein the supporting structure (20) comprises a supporting sail (22) having a first area and a restraint (24) having a second area smaller than the first area, the supporting sail (22) being positioned between the restraint (24) and the airbag (18).

\* \* \* \* \*